No. 831,419. PATENTED SEPT. 18, 1906.
W. S. DAY.
ATTACHMENT FOR COFFEE POTS, &c.
APPLICATION FILED MAR. 9, 1905.

WITNESSES
F. C. Tanner
C. Macnamara

INVENTOR
WILBUR S. DAY
BY Paul & Paul
HIS ATTORNEYS.

UNITED STATES PATENT OFFICE.

WILBUR S. DAY, OF THIEF RIVER FALLS, MINNESOTA.

ATTACHMENT FOR COFFEE-POTS, &c.

No. 831,419.  Specification of Letters Patent.  Patented Sept. 18, 1906.

Application filed March 9, 1905. Serial No. 249,151.

*To all whom it may concern:*

Be it known that I, WILBUR S. DAY, of Thief River Falls, in the county of Red Lake, State of Minnesota, have invented certain new and useful Improvements in Attachments for Coffee-Pots and Tea-Kettles, of which the following is a specification.

My invention relates to devices for preventing steam from escaping through the open top of a coffee-pot or tea-kettle when the cover is removed and the vessel is being tilted to discharge its contents, the object being to protect the hand of the person holding the vessel from being burned or scalded by the escaping steam.

A further object is to provide a device of the character named which can also be utilized as a funnel when detached from the vessel in which it is ordinarily used.

The invention consists generally in various constructions and combinations, all as hereinafter described and particularly pointed out in the claims.

Figure 1:
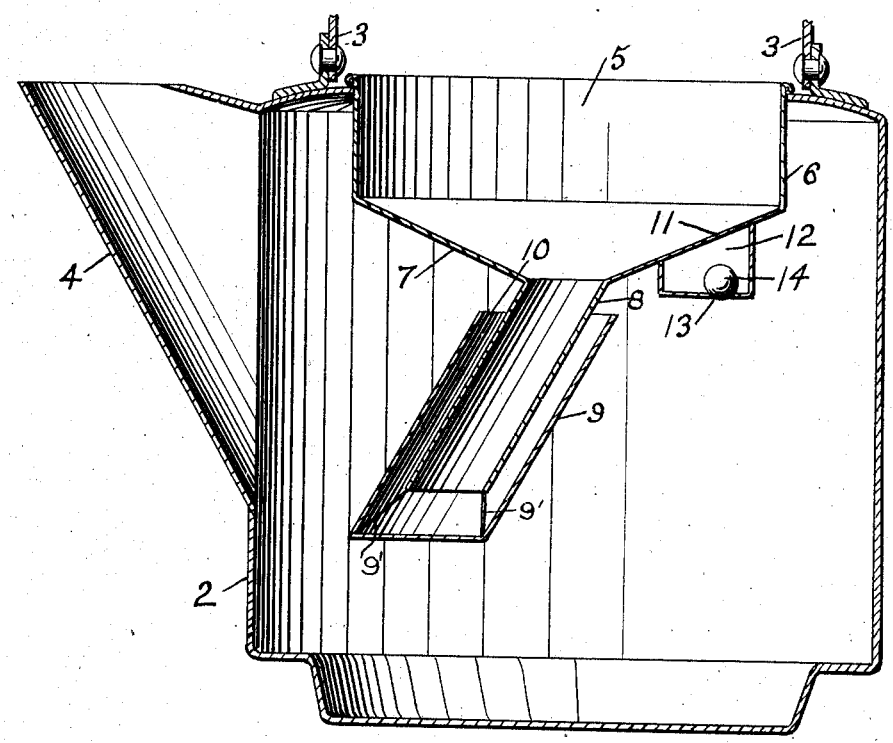
Figure 2:
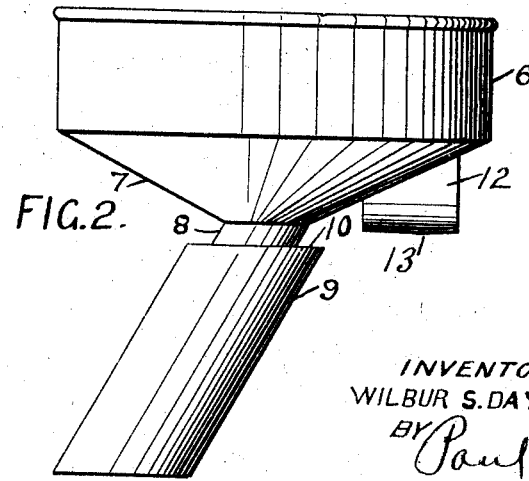

In the accompanying drawings, forming part of this specification, Figure 1 is a vertical section of a tea-kettle and an attachment therefor embodying my invention. Fig. 2 is a side elevation of the attachment separated from the vessel.

In the drawings, 2 represents a tea-kettle of the ordinary type having a handle 3, discharge-spout 4, and an open top 5. Within this open top I place a receptacle 6, preferably of sheet metal, that rests upon the walls of the kettle at the top and is provided with a hopper bottom 7, that terminates in a tube 8, that is inclined or obliquely arranged with respect to the walls of the kettle, and has an open lower end that is contiguous to the opening into the spout 4. An overflow cup or trap 9, closed at the bottom and having an open top 10, is supported by braces 9' on the tube 8 concentric therewith and spaced from the walls thereof. This cup will contain a supply of the liquid in the kettle and acts as a trap to seal the contents and prevent the steam from escaping up through the open lower end of the tube. When the vessel is being filled, the liquid will flow down through the tube 8 and filling the cup overflow the walls thereof into the kettle beneath until the desired amount of liquid has been poured therein. Then when the vessel is tilted to discharge its contents the lower end of the tube will be beneath the level of the same, and being near the spout will allow the contents of the vessel to be poured out without the open lower end of the tube being exposed and allowing the escape of the steam. The overflow cup or trap acts as an adjunct to the tube to more effectually seal the same and exclude the escape of the steam without, however, in any way interfering with the pouring operation. It is desirable in a device of this kind to provide an air-vent, and I therefore form a hole 11 in the hopper bottom 7, communicating with a chamber 12 beneath, that has a hole 13, leading into the kettle, and a loose ball-valve 14, that normally covers the hole 13 when the kettle is in its normal position, but is adapted to roll away from said hole and allow the air to enter through the vent when the kettle is tilted to pour out its contents.

The device may be made of any suitable material, preferably sheet metal, plated, if desired, and of different sizes and with different lengths of tubes and traps, according to the size and shape of the vessel in which it is to be placed.

I claim as my invention—

1. The combination, with a vessel having an open top and a discharge-spout on one side, of a receptacle fitting within said open top, a tube depending from the bottom of said receptacle and being obliquely arranged with respect to the walls of the vessel and having an open lower end that is contiguous to the opening into said discharge-spout whereby when the vessel is tilted to pour out its contents said open lower end will remain below the level of the liquid in the pot until nearly all of the liquid has been poured out and an overflow-cup inclosing the lower portion of said tube, substantially as described.

2. The combination, with a vessel having an open top and a discharge-spout in its side wall, of a receptacle fitting within said open top, a tube depending from the bottom of said receptacle and inclined toward said spout and having an open lower end that is contiguous to the opening into said spout, an overflow-cup inclosing the lower portion of said tube and said receptacle being provided with an air-vent, substantially as described.

3. The combination, with a vessel having an open top and a discharge-spout, of a receptacle fitting within said open top, a tube depending from said receptacle and inclined toward said spout and having an open lower end that is contiguous to the opening into said spout, and an overflow-cup having an open top and closed bottom and inclosing the lower portion of said tube and spaced therefrom, for the purpose specified.

In witness whereof I have hereunto set my hand this 4th day of March, 1905.

WILBUR S. DAY.

Witnesses:
C. S. DE CUER,
ALBERT LOUSON.